(12) United States Patent
Takamura et al.

(10) Patent No.: US 7,042,332 B2
(45) Date of Patent: May 9, 2006

(54) ELECTRONIC KEY SYSTEM

(75) Inventors: Kimitake Takamura, Aichi (JP);
Osamu Inagaki, Aichi (JP); Yuuji Shibagaki, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 155 days.

(21) Appl. No.: 10/357,909

(22) Filed: Feb. 4, 2003

(65) Prior Publication Data
US 2003/0146820 A1   Aug. 7, 2003

(30) Foreign Application Priority Data
Feb. 4, 2002  (JP) .............................. 2002-027246

(51) Int. Cl.
  G05B 19/00   (2006.01)
  G06F 7/00    (2006.01)
  G08B 29/00   (2006.01)
  H04B 1/00    (2006.01)
  H04L 9/14    (2006.01)

(52) U.S. Cl. ...................... 340/5.24; 340/5.2; 340/5.22
(58) Field of Classification Search ................ 340/5.7, 340/5.71, 5.72, 5.73, 5.6, 5.61, 5.64, 5.42, 340/5.2, 5.21, 5.22; 705/56, 410
See application file for complete search history.

(56) References Cited
U.S. PATENT DOCUMENTS
5,767,784 A * 6/1998 Khamharn ................ 340/5.23
5,973,611 A * 10/1999 Kulha et al. ............... 340/5.62
6,043,753 A * 3/2000 Okayasu et al. ........... 340/5.26
6,329,901 B1* 12/2001 Brinkmeyer et al. ....... 340/5.4
6,577,226 B1* 6/2003 Steiner ...................... 340/5.62
6,700,476 B1* 3/2004 Okada et al. .............. 340/5.62

FOREIGN PATENT DOCUMENTS
DE   196 43 759 A1   4/1998
DE   197 53 401 A1   6/1999
EP   0 716 399 A1    6/1996
EP   1 031 480 A1    8/2000

OTHER PUBLICATIONS
European Search Report, dated Feb. 10, 2005, issued in corresponding European Application No. EP 03002307.

* cited by examiner

Primary Examiner—Michael Horabik
Assistant Examiner—Nam Nguyen
(74) Attorney, Agent, or Firm—Synnestvedt & Lechner LLP

(57) ABSTRACT

An electronic key system has a portable apparatus, an operation control device and an update control device. The portable apparatus selectively transmits a first signal and a second signal. The operation control device authorizes an operation of a key based on reception of the first signal. The update control device transmits an update signal in a private region of the owner of the portable apparatus. The portable apparatus has a counter and a portable apparatus controller. When receiving the update signal, the portable apparatus controller resets the counter. When the counting value of the counter is equal to or less than a predetermined limit value, the controller selects the first signal as a signal to be transmitted. When the counting value is in excess of the limit value, the controller selects the second signal as a signal to be transmitted.

14 Claims, 9 Drawing Sheets

ELECTRONIC KEY SYSTEM

BACKGROUND OF THE INVENTION

The present invention relates to an electronic key system for locking/unlocking a door of, for example, a vehicle or a house or for authorizing (allowing) starting of a vehicle engine.

Conventionally, a key using system such as a vehicle or house door locking device or an engine starter is provided with such an immobilizer function as to authorize locking/unlocking of the door or starting of the engine if an attempted communication is established between the key and the lock. In such a system, it is difficult to duplicate the key and also to unlock the door except by a regular key or start the engine, thus improving security.

By such a conventional system, however, if the regular key itself is stolen or lost, it may be used to illegally unlock the door or start the engine.

SUMMARY OF THE INVENTION

It is an object of the present invention to provide an electronic key system which prevents a third party from using a stolen or lost key in an attempt of locking/unlocking or vehicle engine starting.

To achieve this object, the present invention provides an electronic key system. The electronic key system has a portable apparatus that is carried by an owner, an operation control device, security means and an update control device. The portable apparatus selectively wirelessly transmits a first signal and a second signal. An operation control device authorizes an operation of a predetermined operation object based on reception of the first signal transmitted by the portable apparatus. Security means operates based on reception of the second signal transmitted by the portable apparatus. The update control device wirelessly transmits an update signal in a private region of the owner of the portable apparatus. The portable apparatus has a counter and a portable apparatus controller. The counter counts time or a value that represents the number of times that the portable apparatus is used for controlling the operation control device. When receiving the update signal, the portable apparatus controller resets the counter. When the counting value of the counter is equal to or less than a predetermined limit value, the portable apparatus controller selects the first signal as a signal to be transmitted. When the counting value of the counter is in excess of the limit value, the portable apparatus controller selects the second signal as a signal to be transmitted.

The present invention also provides another electronic key system. The electronic key system has a portable apparatus that is carried by an owner, an operation control device, security means and an update control device. The portable apparatus wirelessly transmits an information signal including a portable apparatus information. The operation control device controls an operation of a predetermined operation object. The operation control device receives the information signal transmitted from the portable apparatus. The update control device wirelessly transmits a request signal in a private region of the owner of the portable apparatus. The portable apparatus wirelessly transmits a response signal based on reception of request signal. The update control device receives the response signal and the portable apparatus information that is included in the information signal from the operation control device. The update control device has a counter for counting time or a value that represents the number of times that the portable apparatus is used for controlling the operation control device. When receiving the request signal, the portable apparatus controller resets the counter. When receiving the portable apparatus information, the update control device commands the operation control device to authorize the operation of the operation object if the counting value of the counter is equal to or less than a predetermined limit value. The update control device causes the security means to perform security if the counting value of the counter is in excess of the limit value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

The following will describe in detail a first embodiment implementing the present invention with reference to FIGS. 1 to 4.

Figure 1:
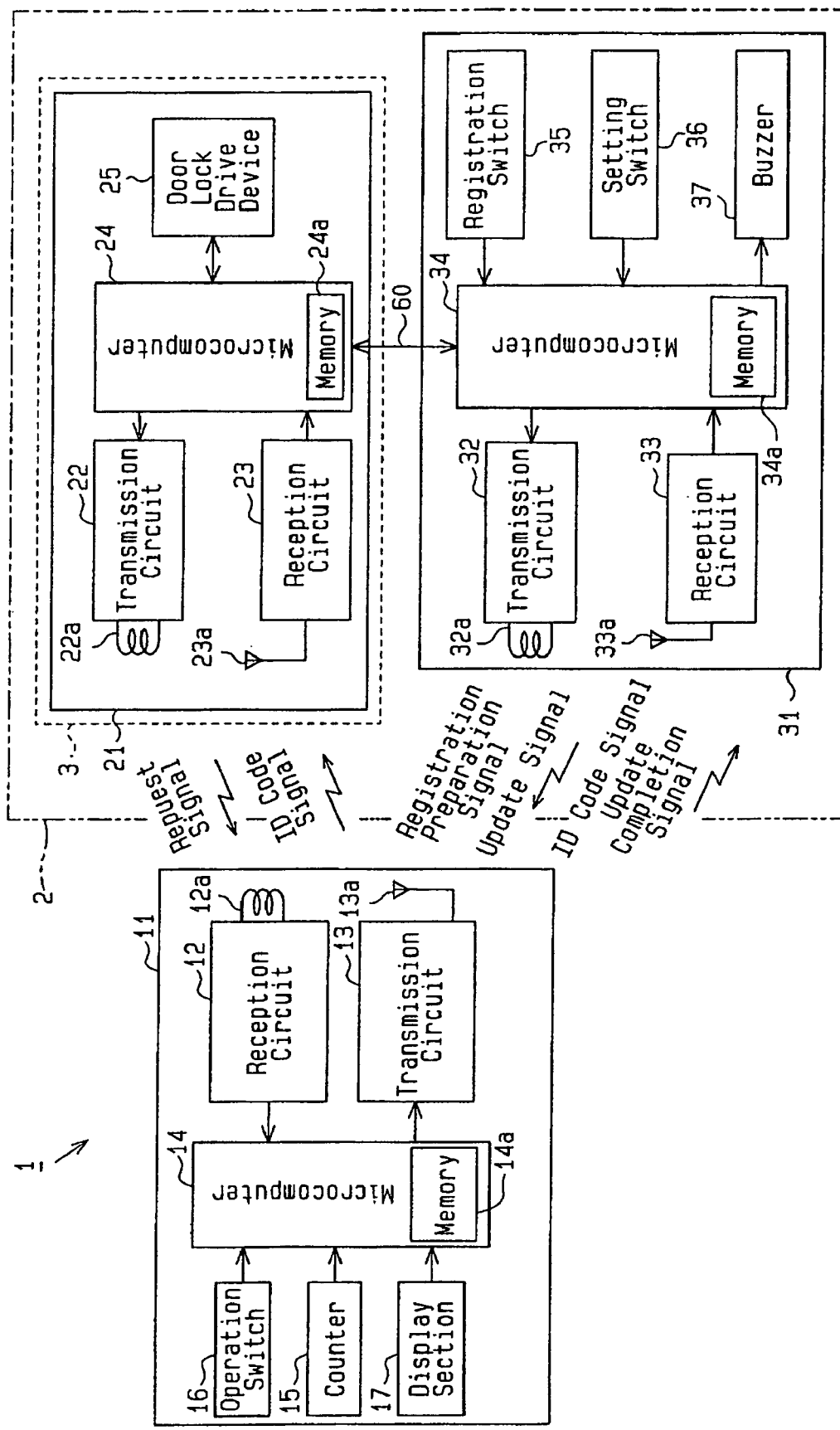
FIG. 1 is a block diagram showing a schematic configuration of an electronic key system according to a first embodiment of the present invention.
Figure 2:
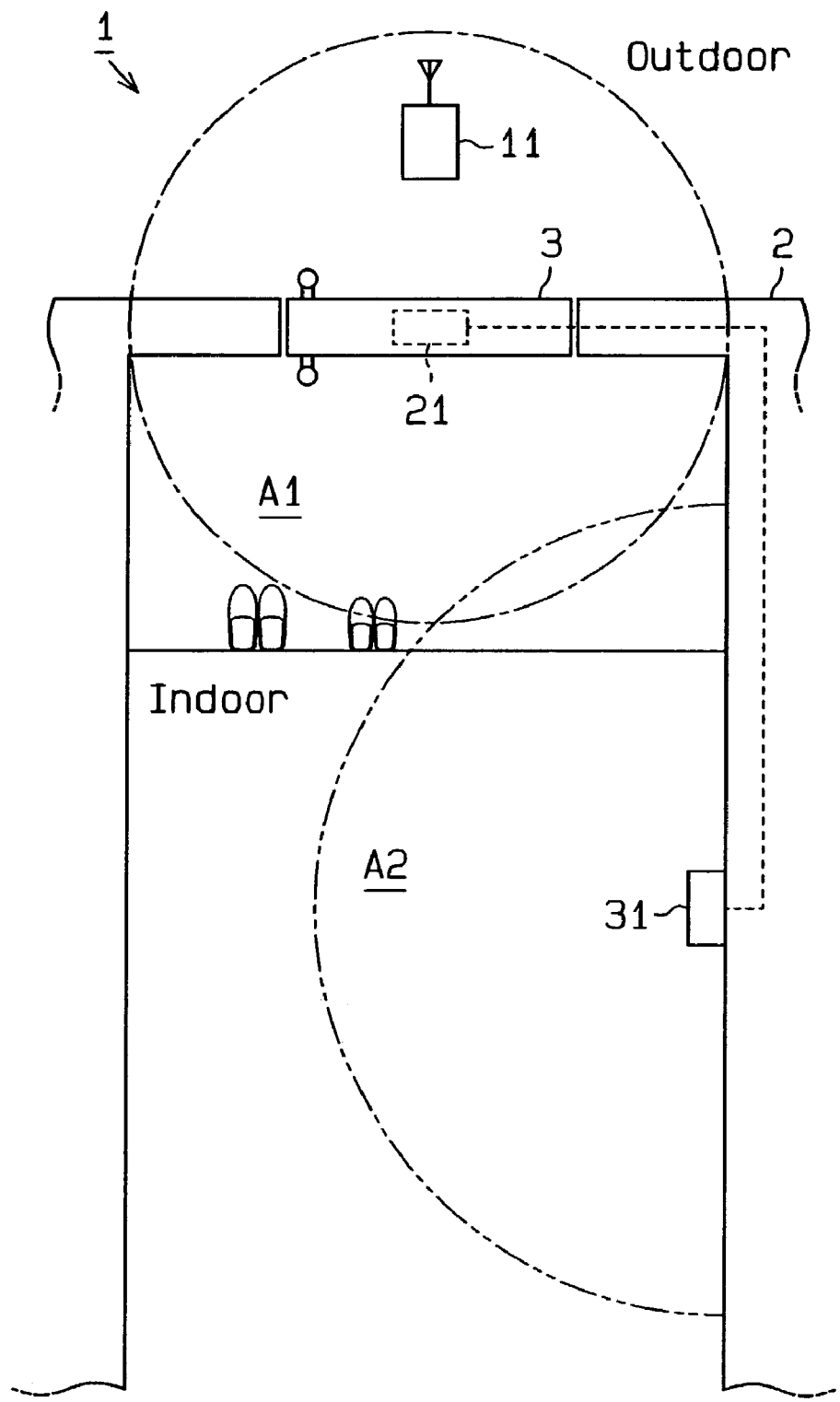
FIG. 2 is a schematic plan view showing part of a house which is equipped with the electronic key system of FIG. 1.

As shown in FIGS. 1 and 2, an electronic key system 1 comprises a portable apparatus 11 which is carried by the owner (occupant of the house), an operation control device 21, and an update control device 31.

The portable apparatus 11 is provided with a reception circuit 12, a transmission circuit 13, a microcomputer 14, a counter 15, an operation switch 16, and a display section 17.

A reception antenna 12a and a microcomputer 14 are connected to the reception circuit 12. The reception circuit 12, when having received through the reception antenna 12a a variety of transmit signals sent from the operation control device 21 or the update control device 31, demodulates these signals into a pulse signal and inputs it to the microcomputer 14.

A transmission antenna 13a and the microcomputer 14 are connected to the transmission circuit 13. The transmission circuit 13 modulates an output signal of the microcomputer 14 into a radio wave having a predetermined frequency (300

MHz in the present embodiment) and transmits it to the outside via the transmission antenna 13a.

The microcomputer 14 is specifically a control unit which is comprised of a CPU, a ROM, a RAM, which are not shown, and is provided also with a non-volatile memory 14a. The memory 14a records therein a pre-set predetermined ID code and a predetermined use limit value (time value in the present embodiment).

When having received a registration preparation signal from the update control device 31 via the reception antenna 12a, the microcomputer 14 automatically outputs to the transmission circuit 13 a predetermined registered ID code signal including an ID code. Furthermore, when having received a request signal from the operation control device 21 via the reception antenna 12a, the microcomputer 14 automatically outputs a decision code comprised of an operation permitting code and a first ID code including the above-mentioned ID code, or the decision code comprised of an operation disabling code and a second ID code including the ID code.

The counter 15, the operation switch 16, and the display section 17 as reporting means are connected to the microcomputer 14. The counter 15 counts time which has elapsed from a predetermined moment, based on an operation signal sent from the microcomputer 14. The counter 15 is set to zero in an initial state. The counter 15 counts elapsed time in accordance with an adding method. The microcomputer 14, when having received an update signal via the reception antenna 12a from the update control device 31, performs update processing of putting a count value of the counter 15 into the initial state, that is, automatically updates it to zero. Furthermore, if a use limit value included in the update signal is different from that already recorded in the memory 14a, the microcomputer 14 records the use limit value included in the update signal in the memory 14a in the update processing. Upon completion of this update processing, the microcomputer 14 outputs an update completion signal to the transmission circuit 13.

The operation switch 16 is comprised of a push button switch provided on a design face of the portable apparatus 11. When the operation switch 16 is operated, the microcomputer 14 outputs a manual operation signal to the transmission circuit 13.

The display section 17 is comprised of an LED provided on a visible part of the portable apparatus 11. It is to be noted that the display section 17 may be comprised of a liquid crystal display. If the count value of the counter 15 is not more than a use limit value, the microcomputer 14 does not operate the display section 17 and, otherwise, operates it. That is, the microcomputer 14 indicates whether the count value of the counter 15 is in excess of a use limit value, in accordance with whether the display section 17 is operating or not.

The operation control device 21, on the other hand, is provided on a door 3 of a house 2 as shown in FIG. 2. As shown in FIG. 1, the operation control device 21 includes a transmission circuit 22, a reception circuit 23, a microcomputer 24, and a door lock drive device 25. The operation control device 21 communicates with an update control device 31, which will be discussed below, through a cable 60.

A transmission antenna 22a is connected to the transmission circuit 22. The transmission circuit 22 converts the request signal output from the microcomputer 24 into a radio wave signal having a predetermined frequency (134 kHz in this case) and outputs it via the transmission antenna 22a to a predetermined region around the door 3. It is to be noted that as shown in FIG. 2 the request signal in the present embodiment is output to a first region A1 which is on the indoor and outdoor sides around the door 3.

A reception antenna 23a is connected to the reception circuit 23. The reception circuit 23 receives via the reception antenna 23a the ID code signal transmitted from the portable apparatus 11. The reception circuit 23 demodulates this ID code signal into a pulse signal and also outputs it to the microcomputer 24.

The microcomputer 24 is specifically a control unit which is comprised of a CPU, a ROM, and a RAM, which are not shown, and is provided with a non-volatile memory 24a. The memory 24a records therein a pre-set predetermined ID code. The microcomputer 24 outputs the request signal to the transmission circuit 22 intermittently.

The door lock driver device 25 is electrically connected to the microcomputer 24. The door lock driver device 25 is equipped with an actuator, not shown, which selectively locks/unlocks the door. The actuator is driven in accordance with a received electrical signal.

When the first or second ID code signal transmitted from the portable apparatus 11 in accordance with the request signal sent from the operation control device 21 has been received by the reception circuit 23 via the reception antenna 23a, the microcomputer 24 compares an ID code included in either one of these two ID code signals to that recorded in the memory 24a (ID code collation). Furthermore, the memory 24a has a predetermined decision code recorded therein. The microcomputer 24 compares a decision code included in either of these two ID code signals to that recorded in the memory 24a (decision processing), to decide whether the decision code included in both ID code signals is an operation permitting code. As a result, if it decides that these ID codes agree with each other and that the decision code is the operation permitting code, the microcomputer 24 outputs an unlocking drive signal requesting unlocking to the door lock drive device 25 to cause it unlock the door. If it cannot receive none of these two ID code signals, on the other hand, the microcomputer 24 outputs a locking drive signal requesting locking to the door lock drive device 25 to cause it lock the door.

When an registration authorization signal transmitted from the update control device 31 has been received by the operation control device 21 through the cable 60, the microcomputer 24 records an ID code included in this registration authorization signal in the memory 24a and outputs a registration completion signal to the transmission circuit 22.

As shown in FIG. 2, the update control device 31 is mounted inside the house 2 on a wall distant from the door 3 by a predetermined distance. As shown in FIG. 1, the update control device 31 includes a transmission circuit 32, a reception circuit 33, and a microcomputer 34.

A transmission antenna 32a is connected to the transmission circuit 32. The transmission circuit 32 converts the registration preparation signal or the update signal output from the microcomputer 34 into a radio wave signal having a predetermined frequency (134 kHz in the present embodiment) and transmits this radio wave signal to a peripheral predetermined region via the transmission antenna 32a. It is to be noted that as shown in FIG. 2 in the present embodiment the registration preparation signal or the update signal is transmitted to a second region A2 which is only on the indoor side of the house 2 in the periphery of the update control device 31. That is, neither the registration preparation signal nor the update signal is transmitted to the outdoor side of the house 2.

To the reception circuit 33 is connected a reception antenna 33a. The reception circuit 33 receives via the reception antenna 33a the ID code signal or the update completion signal transmitted from the portable apparatus 11. The reception circuit 33 demodulates the ID code signal or the update completion signal into a pulse signal and also outputs it to the microcomputer 34.

The microcomputer 34 is specifically a control unit which is comprised of a CPU, a ROM, and a RAM, which are not shown, and is provided with a non-volatile memory 34a. The memory 34a records therein an ID code or a use limit value of the portable apparatus 11. To the microcomputer 34 are connected a registration switch 35, a setting switch 36 as setting means, and a buzzer 37 as reporting means. The microcomputer 34 is electrically connected with the microcomputer 24 of the operation control device 21 through an interface portion not shown. That is, as shown in FIGS. 1 and 2, the operation control device 21 and the update control device 31 are interconnected electrically.

The registration switch 35 is comprised of a push button switch. When the registration switch 35 is operated, the microcomputer 34 enters a registration mode. In the registration mode, the microcomputer 34 outputs the registration preparation signal to the transmission circuit 32. When having received the registered ID code signal transmitted from the portable apparatus 11 in accordance with the registration preparation signal, the microcomputer 34 once records an ID code included in the registered ID code signal in the RAM etc. (temporary registration). The microcomputer 34 outputs to the transmission circuit 32 the update signal including a use limit value registered in the memory 34a. When having received the update completion signal transmitted from the portable apparatus 11 in accordance with this update signal, the microcomputer 34 outputs to the operation control device 21 through the cable 60 the registration authorization signal including the above-mentioned ID code. When having received the registration completion signal transmitted from the operation control device 21 through the cable 60 in accordance with the registration authorization signal, the microcomputer 34 records in the memory 34a the ID code which has been recorded in the above-mentioned RAM etc. and enters a normal mode.

In the normal mode, the microcomputer 34 intermittently outputs to the transmission circuit 32 the update signal including the use limit value which has been recorded in the memory 34a. When having received the update completion signal transmitted from the portable apparatus 11 in accordance with the update signal, the microcomputer 34 outputs the operation signal to a buzzer 37 to operate it only for short time.

The setting switch 36 is comprised of a push button switch, a dial switch, and a sliding switch and capable of setting a use limit value. When the setting switch 36 is operated, the microcomputer 34 records in the memory 34a a use limit value which has been set by this setting switch 36.

Figure 3:
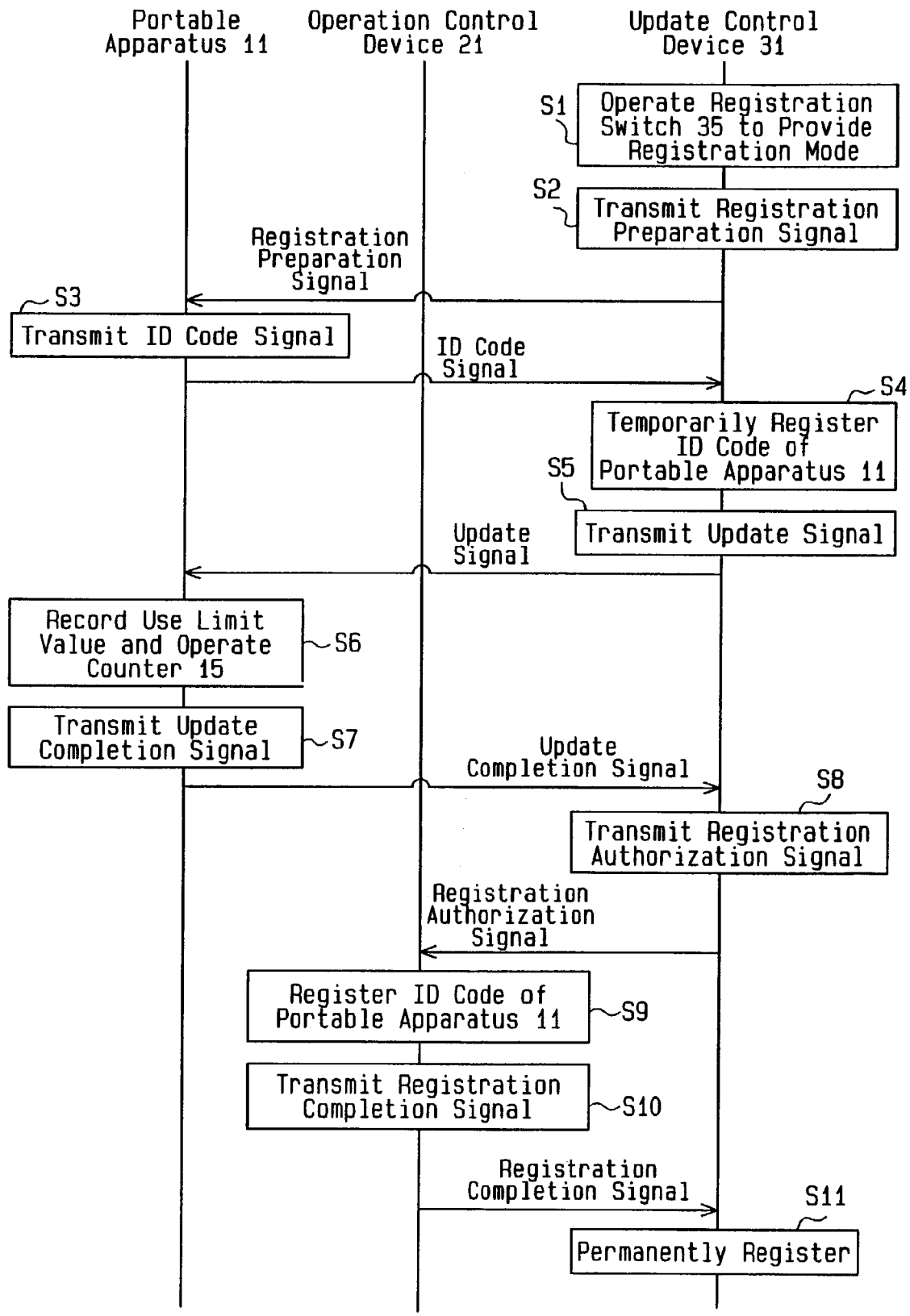
FIG. 3 is a sequence chart showing a registration procedure in the electronic key system of FIG. 1.
Figure 4:
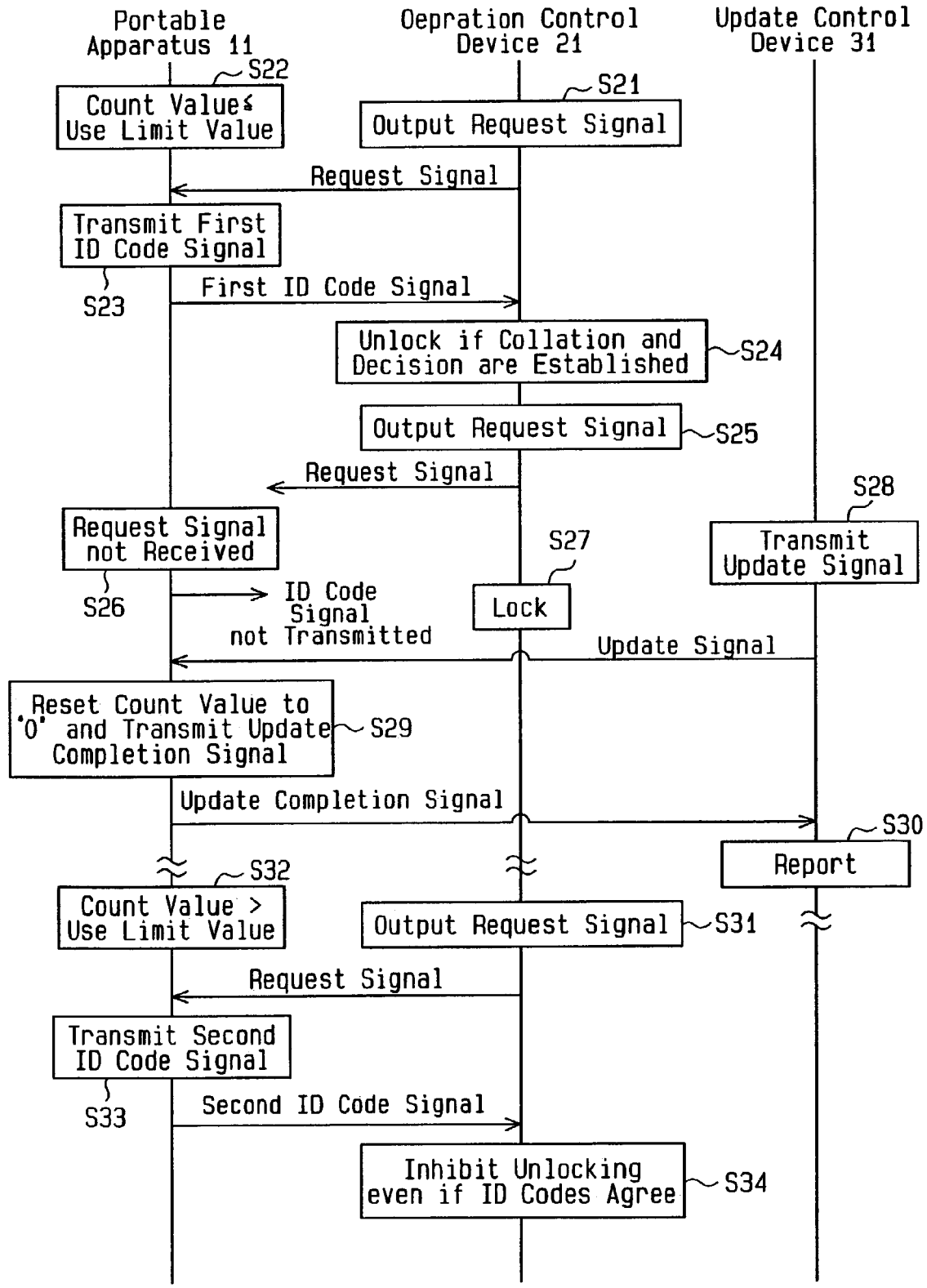
FIG. 4 is a sequence chart showing locking/unlocking and updating operations in the electronic key system of FIG. 1.

Next, an operation aspect of the electronic key system 1 having the above-mentioned configuration is described referring to sequence charts shown in FIGS. 3 and 4.

<1> Procedure for Registering Portable Apparatus 11

As shown in step S1 of FIG. 3, when the registration switch 35 is operated, the update control device 31 enters the registration mode, to transmit the registration preparation signal to the second region A2 shown in FIG. 2 as shown in step S2. When having received this registration preparation signal in the second region A2, the portable apparatus 11 transmits the ID code signal to the update control device 31 as shown in step S3.

When having received the registered ID code signal from the portable apparatus 11, the update control device 31 once records in the RAM etc. the ID code included in the registered ID code signal as shown in step S4. Next, the update control device 31 transmits the update signal to the second region A2 as shown in step S5. It is to be noted that the update signal includes the above-mentioned use limit value which has been set by the setting switch 36.

When having received the update signal from the update control device 31, the portable apparatus 11 records in the memory 14a the use limit value included in the update signal and also operates the counter 15 as shown in step S6. The counter 15 starts counting time which has elapsed from a moment when the use limit value was set in the memory 14a. Upon completion of processing of step S6, the portable apparatus 11 performs processing of step S7, that is, transmits the update completion signal to the update control device 31.

When having received the update completion signal from the portable apparatus 11, the update control device 31 transmits the registration authorization signal to the operation control device 21 through the cable 60 as shown in step S8. The operation control device 21 records in the memory 24a the ID code of the portable apparatus 11 included in the registration authorization signal as shown in step S9. That is, in step S9, the operation control device 21 registers the ID code of the portable apparatus 11. Upon completion of the registration processing, the operation control device 21 transmits the registration completion signal to the update control device 31 through the cable 60 as shown in step S10. Next, in step S11, when having received the registration completion signal from the operation control device 21, the update control device 31 records in the memory 34a the above-mentioned temporarily registered ID code.

By such registration processing, the ID code of the portable apparatus 11 is registered in the operation control device 21 and the update control device 31, thus making it possible to carry out the subsequently described operations of locking/unlocking the door based on communication between the portable apparatus 11 and the operation control device 21 and of updating based on communication between the portable apparatus 11 and the update control device 31.

<2> Locking/Unlocking and Update Operations

As shown in step S21 of FIG. 4, the operation control device 21 outputs the request signal to the first region A1 shown in FIG. 2. If the portable apparatus 11 has entered the first region A1 in a condition where the count value of the counter 15 is not more than a use limit value recorded in the memory 14a as shown in step S22, the first ID code signal is transmitted from the portable apparatus 11 to the operation control device 21 as shown in step S23. That is, when having received the request signal in the condition where the count value of the counter 15 is not more than a use limit value, the portable apparatus 11 transmits this first ID code signal to the operation control device 21.

When having received the first ID code signal, the operation control device 21 performs the above-mentioned ID code collation and decision processing. If it decides that the ID codes have agreed and also that the first ID code signal includes an operation permitting code, the operation control device 21 outputs the unlocking drive signal to the door lock drive device 25 to cause it to unlock the door.

Subsequently, as shown in step S25, the operation control device 21 outputs the request signal. For example, if the portable apparatus 11 cannot receive the request signal because it has moved out of the first region A1 of the request signal, it stops transmitting the ID code signal as shown in step S26. Accordingly, the operation control device 21 outputs the locking drive signal to the door lock drive device 25 to cause it lock the door as shown in step S27.

Therefore, if the count value of the counter 15 of the portable apparatus 11 is not more than a use limit value, the owner of the portable apparatus 11 can automatically unlock the door 3 only by approaching it and can automatically lock it only by departing from it.

Furthermore, as shown in step S28, the update control device 31 transmits the update signal to the second region A2. For example, when having entered the second region A2 and received this update signal, the portable apparatus 11 resets the count value of the counter 15 to zero and also transmits the update completion signal to the update control device 31 as shown in step S29. It is to be noted that if a use limit value included in this update signal is different from an existing use limit value already recorded in the memory 14a, the portable apparatus 11 erases the existing use limit value and, instead, records the use limit value included in the update signal in the memory 14a. That is, in this case, the portable apparatus 11 rewrites a use limit value to be recorded in the memory 14a. The portable apparatus 11 transmits the above-mentioned update completion signal to the update control device 31 after it has completed such alteration of the use limit value.

When having received the update completion signal from the portable apparatus 11, the update control device 31 outputs the operation signal to the buzzer 37 to operate it only for short time as shown in step S30.

There may be a case where even when the request signal has been output from the operation control device 21 as shown in step S31, this request signal is received by the portable apparatus 11 in a condition where the count value of the counter 15 is in excess of a use limit value recorded in the memory 14a as shown in step S32. In this case, the portable apparatus 11 transmits the second ID code signal to the operation control device 21 as shown in step S33. Since the second ID code signal includes a operation disabling code as a decision code, the operation control device 21 inhibits unlocking of the door even when it has received the second ID code signal. That is, when having received the second ID code signal, the operation control device 21 inhibits locking/unlocking based on mutual communication between itself and the portable apparatus 11 even if the ID codes agree. The operation control device 21 functions as security means that operates based on reception of the second ID code signal transmitted by the portable apparatus 11.

It is to be noted that when the operation switch 16 of the portable apparatus 11 has been operated, the portable apparatus 11 transmits a first manual operation signal including a manual locking/unlocking code, an ID code, and an operation permitting code if the count value of the counter 15 is not more than a use limit value. When having received the first manual operation signal, the operation control device 21 locks/unlocks the door based on the manual locking/unlocking code.

Furthermore, if this operation switch 16 has been operated in a condition where the count value of the counter 15 is in excess of a use limit value, the portable apparatus 11 transmits a second manual operation signal including a manual locking/unlocking code, an ID code, and a operation disabling code. When having received the second manual operation signal, the operation control device 21 inhibits locking/unlocking of the door. That is, if the count value of the counter 15 is in excess of a use limit value, the door is securely inhibited from being locked/unlocked by the portable apparatus 11.

The present embodiment has the following advantages.

When having received the request signal from the operation control device 21 in a condition where the count value of the counter 15 is not more than a use limit value set in the memory 14a, the portable apparatus 11 transmits the first ID code signal including an operation permitting code. Furthermore, when having received the request signal from the operation control device 21 in a condition where this count value is in excess of this use limit value, the portable apparatus 11 transmits the second ID code signal including a operation disabling code. When having received the first ID code signal, the operation control device 21 causes the door to be unlocked, while when having received the second ID code signal, on the other hand, it inhibits the door from being unlocked. Accordingly, this function makes the usable hours of the portable 11 finite, so that even if the portable apparatus 11 is stolen or lost, it is possible to prevent the door from being locked/unlocked using this portable apparatus 11. Furthermore, when having received the update signal transmitted from the update control device 31, the portable apparatus 11 updates the count value of the counter 15 into an initial state (resets to zero). Accordingly, the regular owner of the portable apparatus 11 can update the count value periodically to thereby continue door locking/unlocking operation by use of the portable apparatus 11. In addition, such updating is carried out automatically, so that troublesome updating is not necessary, thus avoiding a degradation in operability of the portable apparatus 11. Furthermore, the update signal is transmitted into the second region A2 which only the regular owner of the portable apparatus 11 can enter, thus securely preventing updating from being carried out by any one other than this owner.

The use limit value can be altered using the setting switch 36 provided on the update control device 31. If a use limit value included in the update signal, when it has been received by the portable apparatus 11, is different from that already recorded in the memory 14a, the portable apparatus 11 records this received use limit value in the memory 14a. Based on this newly recorded use limit value, the portable apparatus 11 conducts control. Accordingly, if, for example, the owner cannot perform updating for a long time, he can set a large use limit value to thereby prevent the count value from exceeding the use limit value. Furthermore, the use limit value is altered by the update control device 31 provided in the house 2. That is, the use limit value can be altered only by the regular owner of the portable apparatus 11, not by a third party.

The portable apparatus 11 is capable of bi-directional communication with the update control device 31, so that upon completion of control based on the update signal, it transmits a completion signal to the update control device 31 to notify it of the completion. When the completion signal has been received by the update control device 31, its buzzer 37 operates. That is, the buzzer 37 operates when mutual communication has been completed between the portable apparatus 11 and the update control device 31. Accordingly, the owner of the portable apparatus 11 can securely recognize normal completion of an update procedure.

The display section 17 of the portable apparatus 11 displays thereon whether the count value given by the counter 15 is not more than a use limit value or in excess of it. Accordingly, the owner of the portable apparatus 11 can securely recognize the state of the portable apparatus 11. Furthermore, because such a report is made, the owner can make a third party as well know that the usability of the portable apparatus 11 is limited, thus diminishing the chance of the apparatus being stolen.

Figure 5:
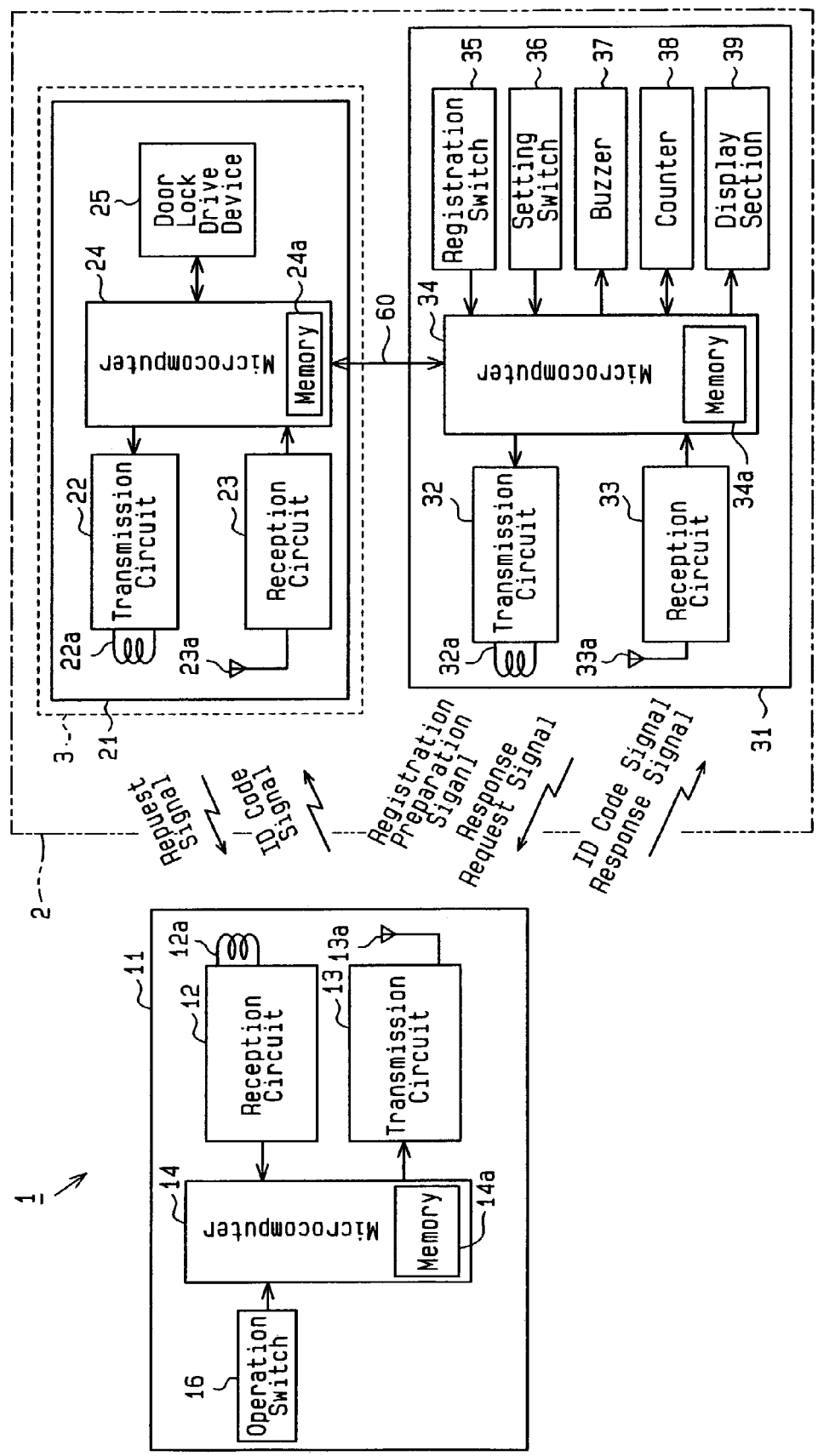
FIG. 5 is a block diagram showing a schematic configuration of an electronic key system according to a second embodiment.
Figure 6:
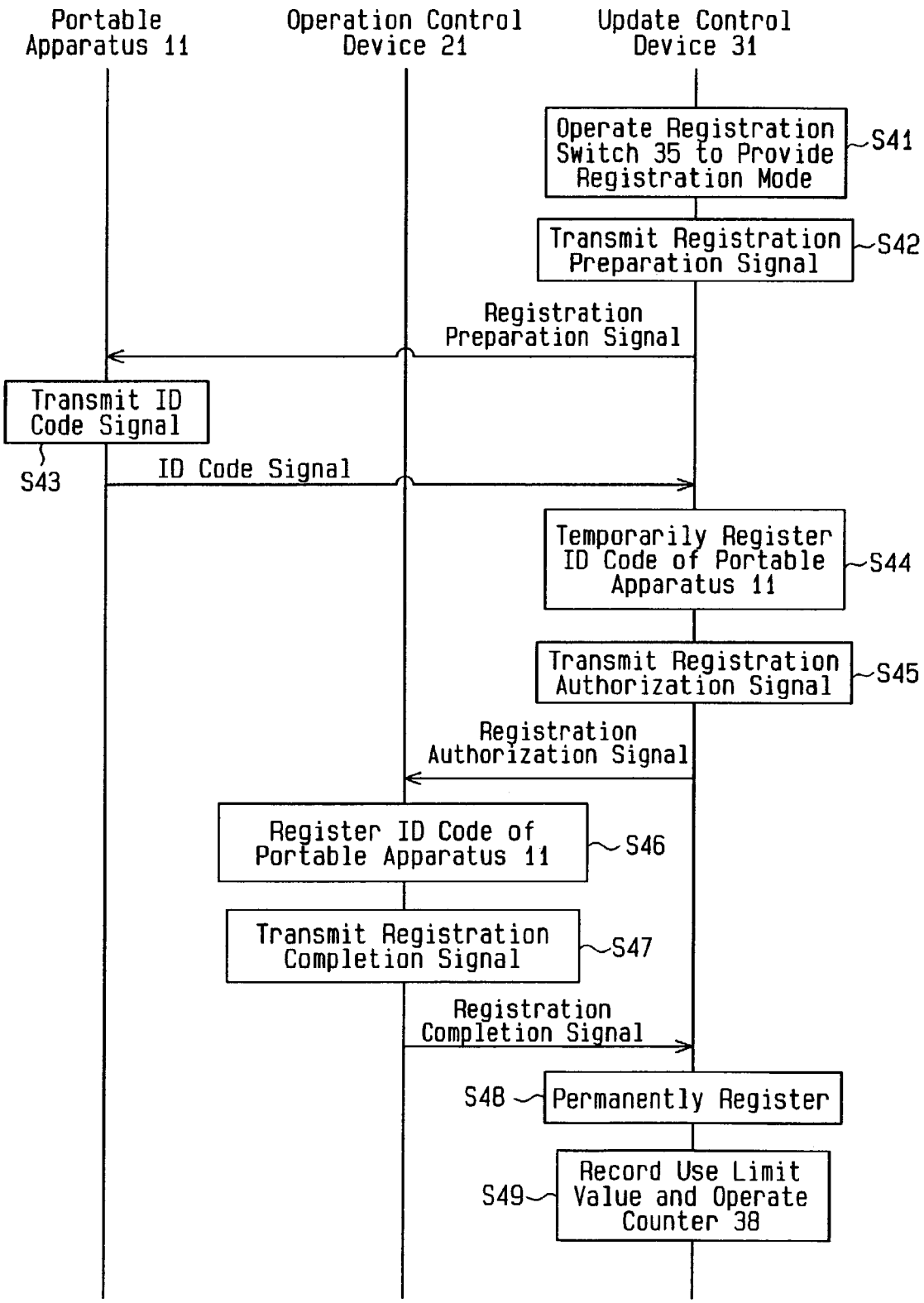
FIG. 6 is a sequence chart showing a registration procedure in the electronic key system of FIG. 5.
Figure 7:
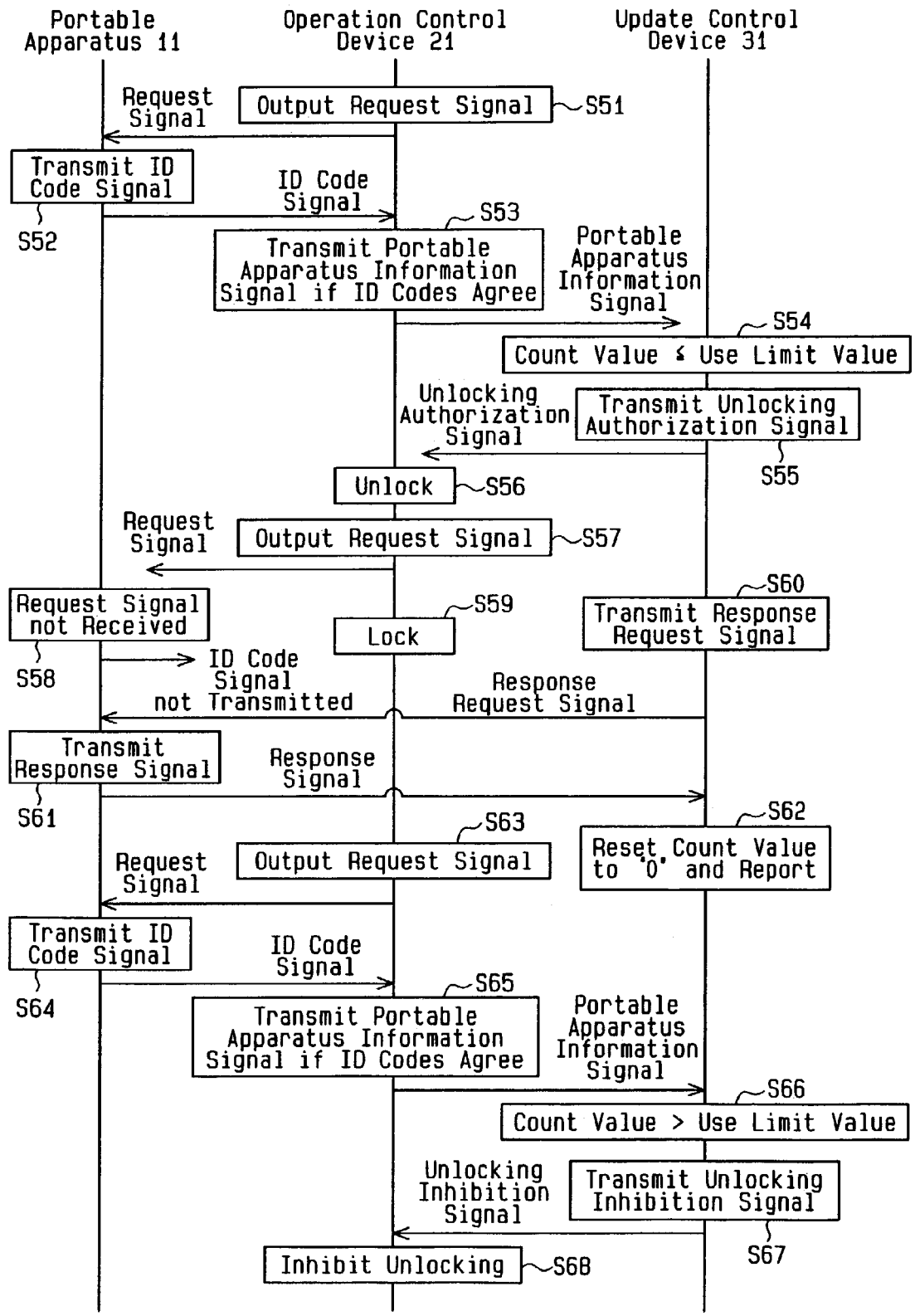
FIG. 7 is a sequence chart showing locking/unlocking and updating operations in the electronic key system of FIG. 5.

The following will describe a second embodiment implementing the present invention with reference to FIGS. 5 to 7. The present embodiment is mainly described on differences from the embodiment of FIGS. 1 to 4, so that components common to these are only indicated by the same reference numerals and their description is omitted.

As shown in FIG. 5, in a portable apparatus 11 according to the present embodiment, the counter 15 and the display section 17 are omitted from that of the first embodiment. Furthermore, such a use limit value as mentioned above is not recorded in a memory 14a.

A microcomputer 14 of the portable apparatus 11 receives via a reception antenna 12a a response request signal transmitted from an update control device 31. When having received the response request signal, the microcomputer 14 automatically outputs to a transmission circuit 13 a response signal including an ID code pre-set in the memory 14a.

An update control device 31 is provided with a counter 38 and a display section 39 which are equivalent to the counter 15 and the display section 17 omitted from the portable apparatus 11 respectively. A memory 34a records therein such a use limit value as described above. More specifically, the memory 34a records therein a use limit value which is set by the above-mentioned setting switch 36.

A microcomputer 34 of the update control device 31 intermittently outputs the response request signal to a transmission circuit 32. Therefore, the transmission circuit 32 converts the response request signal into a radio wave signal having a predetermined frequency (134 kHz in the present embodiment) and transmits it to the second region A2 shown in FIG. 2 via a transmission antenna 32a. When having received via a reception antenna 33a and a reception circuit 33 the response signal transmitted from the portable apparatus 11 in accordance with the response request signal, the microcomputer 34 of the update control device 31 carries out update processing of automatically updating a count value of the counter 15 to an initial state (resetting the count value to zero).

When a use limit value is altered using the setting switch 36, the microcomputer 34 rewrites a use limit value recorded in the memory 34a to this altered value. Upon completion of such update processing, the microcomputer 34 outputs an operation signal to a buzzer 37 to cause it to report to that effect.

Next, an operation aspect of an electronic key system 1 having the above-mentioned configuration is described referring to sequence charts shown in FIGS. 6 and 7.

<1> Procedure for Registering the Portable Apparatus 11

As shown in step S41 of FIG. 6, when a registration switch 35 is operated, the update control device 31 enters a registration mode, to transmit the registration preparing signal to the second region A2 shown in FIG. 2 as shown in step S42. When having entered the second region A2 to receive this registration preparing signal, the portable apparatus 11 transmits an ID code signal to the update control device 31 as shown in step S43.

When having received the ID code signal, the update control device 31 once records (temporarily registers) in a RAM etc. an ID code included in this ID code signal as shown in step S44. Next, the update control device 31 transmits a registration authorization signal to the operation control device 21 through the cable 60 as shown in step S45. As shown in step S46, the operation control device 21 records in the memory 24a the ID code included in the registration authorization signal. That is, in step S46, the operation control device 21 registers an ID code of the portable apparatus 11. Upon completion of such registration processing, as shown in step S47, the operation control device 21 transmits a registration completion signal to the update control device 31. As shown in step S48, when having received the registration completion signal, the update control device 31 records (permanently registers) the above-mentioned temporarily registered ID code in the memory 34a. Next, as shown in step S49, the update control device 31 registers in the memory 34a a use limit value set by the setting switch 36 and also operates the counter 38. The counter 38 starts counting time which has elapsed from a moment when the use limit value was set in the memory 34a.

Such registration processing provides a state where an ID code set in the portable apparatus 11 is registered in the operation control device 21 and the update control device 31. It is thus possible to carry out the subsequently described operations of locking/unlocking the door based on communication between the portable apparatus 11 and the operation control device 21 and of updating based on communication between the portable apparatus 11 and the update control device 31.

<2> Locking/Unlocking and Update Operations

As shown in step S51 of FIG. 7, the operation control device 21 outputs the request signal to the first region A1 shown in FIG. 2. If, for example, the portable apparatus 11 has entered the first region A1 to receive the request signal from the operation control device 21, it automatically transmits the ID code signal to the operation control device 21 as shown in step S52.

When having received the ID code signal from the portable apparatus 11, the operation control device 21 carries out the above-mentioned ID code collation in step S53, to transmit a portable apparatus information signal to the update control device 31 through the cable 60 on condition that the ID codes have agreed. More specifically, the microcomputer 24 of the operation control device 21 transmits the portable apparatus information signal to the microcomputer 34 of the update control device 31 via an interface portion not shown.

When having received the portable apparatus information signal from the operation control device 21, the update control device 31 compares a count value of the counter 38 and a use limit value to each other. If the count value of the counter 38 is not more than the use limit value as shown in step S54, it transmits an unlocking authorization signal to the operation control device 21 through the cable 60 as shown in step S55.

When having received the unlocking authorization signal, the operation control device 21 outputs an unlocking drive signal to the door lock drive device 25 to cause it to unlock the door as shown in step S56.

As shown in step S57, the operation control device 21 continues to output the request signal. If, for example, the portable apparatus 11 goes out of the first region A1 in which it can receive the request signal and so cannot receive the request signal as shown in step S58, it stops transmitting the ID code signal to the operation control device 21. Therefore, the operation control device 21 outputs a locking drive signal to the door lock drive device 25 to cause it lock the door as shown in step S59.

Therefore, as far as the count value of the counter 38 of the update control device 31 is not more than a use limit value, the owner of the portable apparatus 11 only needs to approach the door 3 in order to automatically unlock it and only needs to depart from it in order to automatically lock it.

Furthermore, as shown in step S60, the update control device 31 transmits the response request signal to the second region A2 intermittently. For example, when the portable apparatus 11 has entered the second region A2 to receive this response request signal, it transmits the response signal to the update control device 31 as shown in step S61.

When having received the response signal from the portable apparatus 11, the update control device 31 resets the count value of the counter 38 to zero and outputs the operation signal to the buzzer 37 to operate it only for a short time as shown in step S62.

On the other hand, there may be a case where the count value of the counter 38 is in excess of a use limit value even if the portable apparatus information signal has been transmitted to the update control device 31 through normal mutual communication between the portable apparatus 11 and the operation control device 21 as shown in steps S63 to 65. In this case, as shown in step S67, the update control device 31 transmits an unlocking inhibition signal to the operation control device 21. As shown in step S68, when having received the unlocking inhibition signal, the operation control device 21 inhibits the door from being unlocked. That is, in the condition where the count value of the counter 38 in the update control device is in excess of a use limit value, the operation control device 21 inhibits unlocking operation by means of mutual communication between itself and this portable apparatus 11.

The present embodiment has the following advantages.

The counter 38 of the update control device 31 counts time which has elapsed from a moment when the response signal transmitted from the portable apparatus 11 was received. If the count value of the counter 38 at a moment when the portable apparatus information was received from the operation control device 21 is not more than a use limit value, the update control device 31 transmits the unlocking authorization signal to the operation control device 21. Furthermore, if this count value is in excess of the use limit value, the update control device 31 transmits the unlocking inhibition signal to the operation control device 21. The operation control device 21 unlocks the door only when it has received the unlocking authorization signal. Thus, this function makes the usable hours of the portable apparatus 11 finite. Accordingly, if the portable apparatus 11 is stolen by a third party or lost, it is possible to prevent the door from being locked/unlocked using this portable apparatus 11. Furthermore, when having received the response signal transmitted from the portable apparatus 11, the update control device 31 updates the count value of the counter 38 to an initial state (resets to zero). Accordingly, the regular owner of the portable apparatus 11 can update the count value by periodically performing mutual communication between the portable apparatus 11 and the update control device 31, thus continuing door locking/unlocking operation by use of the portable apparatus 11. In addition, mutual communication between the portable apparatus 11 and the update control device 31, that is, updating of the count value is automatically carried out only by permitting the portable apparatus 11 to approach the update control device 31. Therefore, troublesome updating is not necessary, thus avoiding degradation in operability of the portable apparatus 11. Furthermore, mutual communication between the portable apparatus 11 and the update control device 31 is carried out in the second region A2 which only the regular owner of the portable apparatus 11 can enter, so that it is also possible to securely prevent updating from being carried out by any one other than this owner.

Since it is unnecessary to provide the portable apparatus 11 with the counter 15 and the display section 17, it is possible to simplify the structure of the portable apparatus 11, thus reducing the size and the costs of this portable apparatus 11.

It should be apparent to those skilled in the art that the present invention may be embodied in many other specific forms without departing from the spirit or scope of the invention. Particularly, it should be understood that the invention may be embodied in the following forms.

Figure 8:
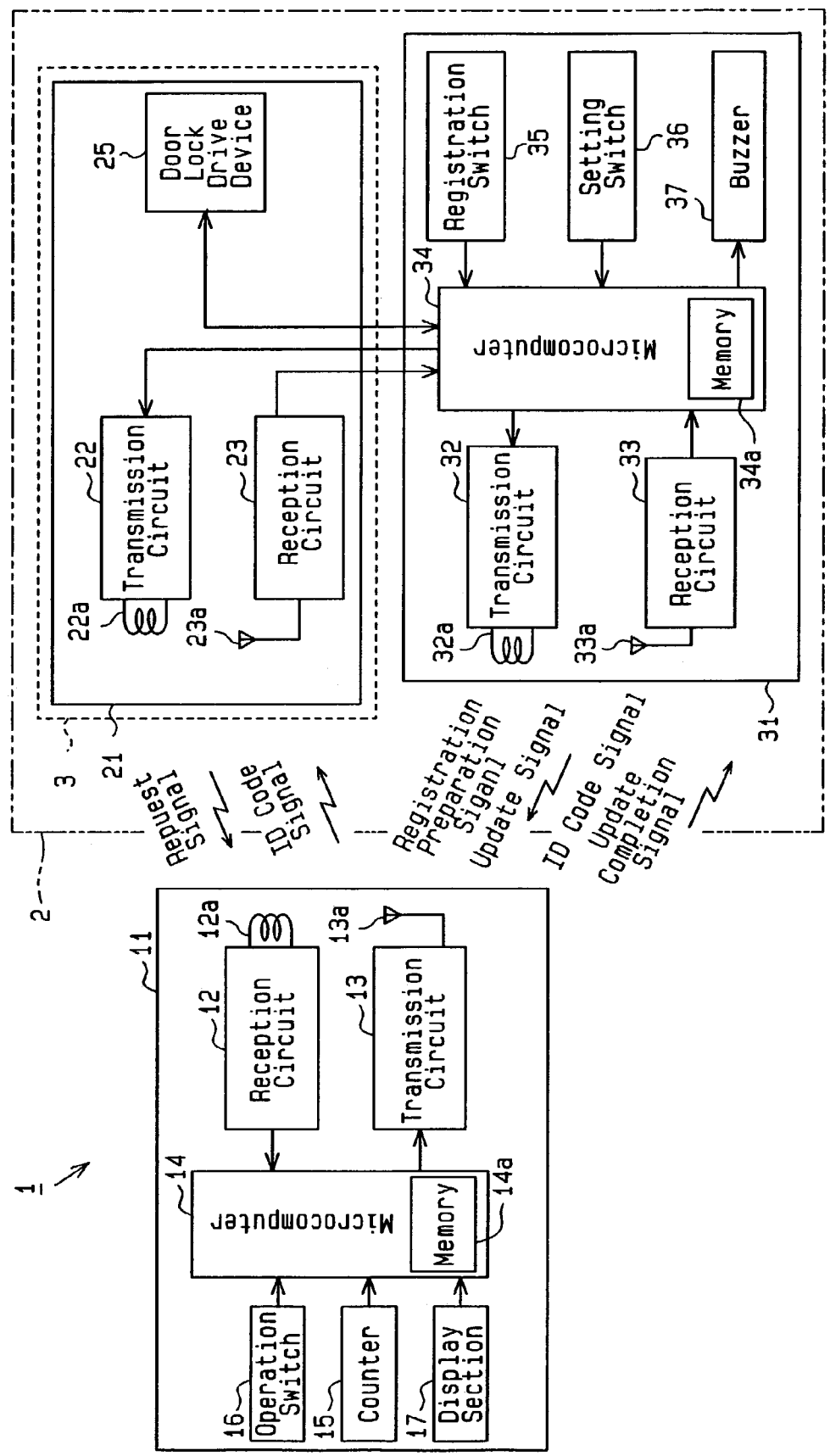
FIG. 8 is a block diagram showing a schematic configuration of an electronic key system in another embodiment.

As shown in FIG. 8, the microcomputer 24 of the operation control device 21 may be omitted, and the transmission circuit 22, the reception circuit 23, and the door lock drive device 25 may be electrically connected to the microcomputer 34 of the update control device 31 via an interface portion not shown. In this configuration, the microcomputer 34 of the update control device 31 of FIG. 8 is caused to carry out the same processing as that performed by the microcomputer 24 of the operation control device 21 in each of the embodiments of FIGS. 1 to 7. Even such a modified embodiment can obtain almost the same effects as those of each of the embodiments of FIGS. 1 to 7 and also simplify the structure of the operation control device 21.

Figure 9:
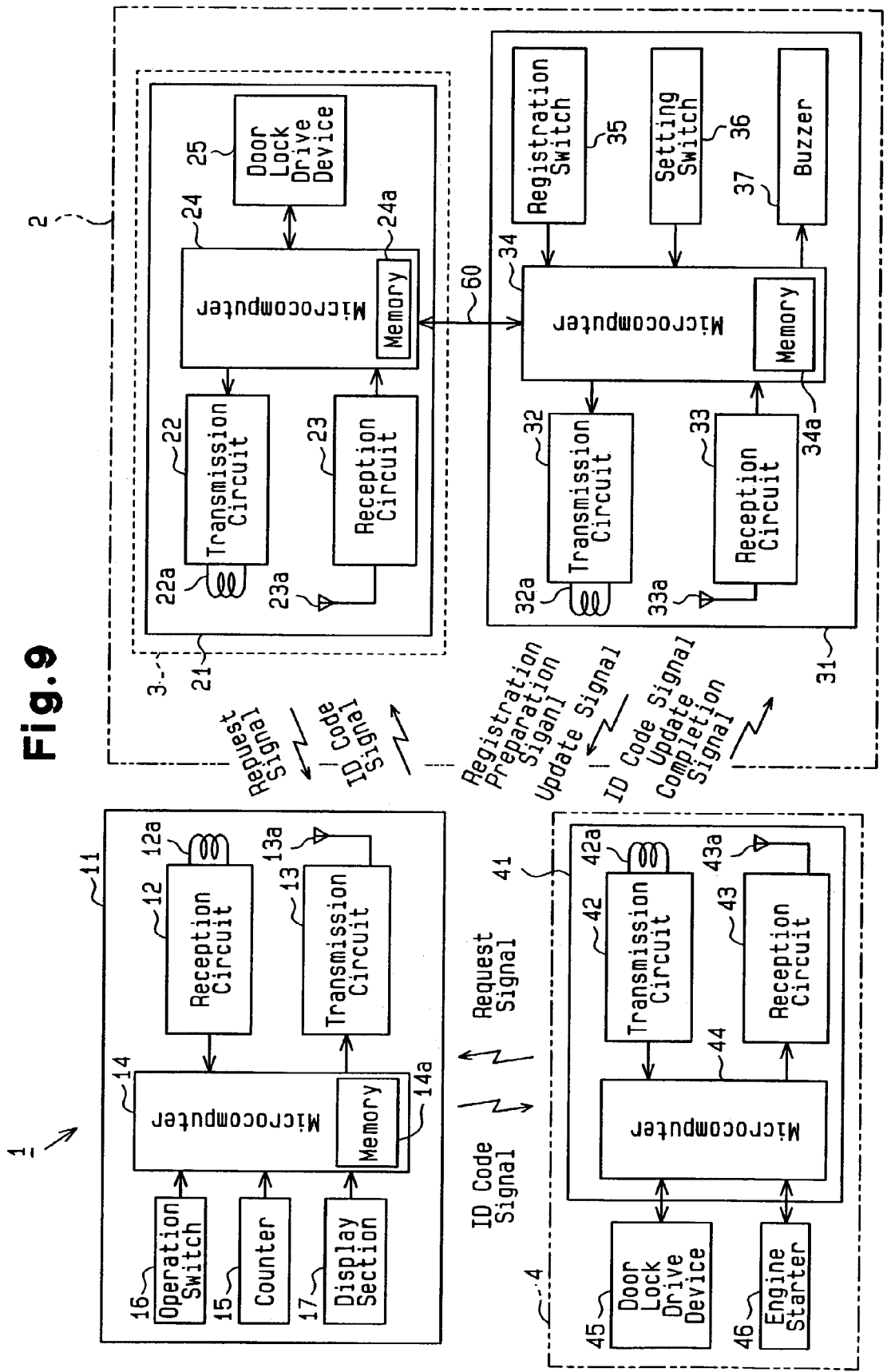
FIG. 9 is a block diagram showing a schematic configuration of an electronic key system in a further embodiment.

As shown in FIG. 9, a vehicle 4 may be provided with an operation control device 41, and vehicle door locking/unlocking and engine starting authorization may be controlled based on wireless communication between the portable apparatus 11 and the operation control device 41.

More specifically, the operation control device 41 comprises a transmission circuit 42, a reception circuit 43, and a microcomputer 44 which give almost the same functions as those of the above-mentioned operation control device 21. The ID code signal has already been registered in the microcomputer 44. The microcomputer 44 outputs the request signal to the transmission circuit 42. The request signal is output via an antenna 42a as a radio signal. The request signal is output to the periphery or inside of the vehicle 4. When having received the request signal, the portable apparatus 11 transmits the above-mentioned ID code signal. When having received the ID code signal via the reception antenna 43a, the reception circuit 43 of the operation control device 41 outputs this received signal to the microcomputer 44. Furthermore, to the microcomputer 44 are connected a door lock drive device 45 and an engine starter 46. The door lock drive device 45 is provided with an actuator, not shown, for locking/unlocking the door of the vehicle 4. The door lock drive device 45 drives the actuator based on an electrical signal it has received. The engine starter 46 authorizes driving of a starter motor if it has received a starting authorization signal from the microcomputer 44 and, otherwise, inhibits it.

When having received the ID code signal transmitted from the portable apparatus 11 in accordance with the request signal, the microcomputer 44 carries out the above-mentioned ID code collation and decision processing. When the microcomputer 44 has received an ID code signal that corresponds to a request signal output to the periphery of the vehicle 4 and if collation of the relevant ID codes is approved and this ID code signal is judged to be the first ID code signal, it outputs the unlocking drive signal to the door lock drive device 45 to cause it to unlock the door. Furthermore, if it detects a mismatch in collation of the ID codes, the microcomputer 44 outputs the locking drive signal to the door lock drive device 45 to cause it to lock the door. If it decides that the received ID code signal is the second ID code signal, on the other hand, the microcomputer 44 inhibits the door from being unlocked.

When the microcomputer 44 has received an ID code signal that corresponds to a request signal output to the inside of the vehicle 4 and if it detects a match in collation of the relevant ID codes, on the other hand, it outputs the starting authorization signal to the engine starter 46 to put the engine into a state in which the engine can be started. Furthermore, if the microcomputer 44 detects a mismatch in collation of the ID codes, it stops outputting the starting authorization signal to the engine starter 46, to put the engine into a state in which the engine cannot be started. In a case where the microcomputer 44 decides that the received ID code signal is the second ID code signal, on the other hand, it maintains the state in which the engine cannot be started.

In such a manner, it is possible both to control locking/unlocking of the door of the house 2 and to control locking/unlocking of the door of the vehicle 4 and starting of the engine, thus diminishing the chance of the vehicle 4 being stolen. It is to be noted that if the present embodiment is applied to the embodiment of FIGS. 5 to 7, the update control device 31 of FIG. 9 is arranged in the vehicle so that the above-mentioned response request signal may be transmitted to the region which only the regular owner of the portable apparatus 11 can enter.

The embodiment of FIG. 9 may be modified by omitting the operation control device 21 and providing an electronic key system 1 that conducts control on at least one of the locking/unlocking of the door of the vehicle 4 and the starting of the engine. That is, the electronic key system 1 is comprised of the portable apparatus 11, the update control device 31, and the operation control device 41.

In each of the embodiments of FIGS. 1 to 9, the use limit value to be recorded in the memory 14a or 34a may be altered to a predetermined number of times of locking/unlocking the door. Then, the count value of the counter 15 or 38 may be altered to the number of times of locking/unlocking the door as counted from a moment when a use limit value was set in the memory 14a or 34a. This operation will make the usability of the portable apparatus 11 finite.

In the embodiment shown in FIGS. 1 to 4, the portable apparatus 11 may be provided with, in place of the display section 17, a speaker or a buzzer that reports by sound or voice. Furthermore, the display section 17 may be omitted. It is to be noted that in such a case, the portable apparatus 11 preferably has such a design as to suggest that it has a "limited validity term".

In each of the embodiments of FIGS. 1 to 9, if the validity term of the portable apparatus 11 has expired, that is, its count value has exceeded its use limit value, the door is not locked/unlocked. The door, however, may be made locked/unlocked even with such a portable apparatus 11 that its validity term has expired. In such a case, an alarming function is provided to the buzzer 37 on the update control device 31 such that, for instance, the buzzer 37 emits loud alarm sound. That is, the buzzer 37 on the update control device 31 functions as the security means. By so doing, even if the door is unlocked illegally by a third party who has stolen the portable apparatus 11 and used it, the alarming sound is given, thus alarming the third party who has unlocked the door illegally. As a result, even if the third party has unlocked the door illegally by using the portable apparatus 11, he must enter the house 2 while the alarming sound is being given, so that he is discouraged from doing so mentally. It is thus possible to inhibit illegal entry into the house 2. Besides, for example, by operating the update control device 31 (for example, by entering a personal identification code) so that the operation of the buzzer 37 can be released, even if the alarming sound is given when an occupant of the house uses the portable apparatus 11 whose validity term has already expired, no serious problem will be caused.

In each of the embodiments of FIGS. 1 to 9, an updated count value of the counter 15 or 38 may be reported by, for example, the display section 17 of the portable apparatus 11.

Furthermore, such reporting of the updated count value may be omitted. By so doing, especially in the embodiment of FIGS. 1 to 4, the update completion signal need not be transmitted from the portable apparatus 11 to the update control device 31, thus making it possible to simplify the structure of a communication mechanism of the electronic key system 1.

In each of the embodiments of FIGS. 1 to 9, the counters 15 and 38 may each employ a subtraction system. In this case, the counters 15 and 38 each have an initial state as set to a use limit value so that they may count by subtracting from this use limit value. It is to be noted that if the present embodiment is applied to that of FIGS. 1 to 4, the portable apparatus 11 transmits the second ID code signal when it has received the request signal from the operation control device 21 in a condition where the count value is zero. If the present embodiment is applied to that of FIGS. 5 to 7, on the other hand, the update control device 31 transmits the unlocking inhibition signal when it has received the portable apparatus information signal in a condition where the count value is zero.

According to each of the embodiments of FIGS. 1 to 9, the electronic key system 1 is provided with such a function that the owner of the portable apparatus 11 only needs to approach the door 3 in order to automatically unlock the door and only needs to leave it in order to automatically lock it, that is, a smart entry function. Such an electronic key system 1, however, need not always be provided with the smart entry function. For example, the operation control device 21 may be intended only to authorize locking/unlocking of the door when mutual communication is established between itself and the portable apparatus 11 in a condition where the count value of the above-mentioned counters 15 or 38 is not more than a use limit value. That is, the electronic key system 1 may be provided with such a function that locking/unlocking by use of a mechanical key is possible only when this mutual communication is established, that is, the immobilizer function. Furthermore, the electronic key system 1 may be provided with such a function that the door is locked/unlocked only when the operation switch 16 of the portable apparatus 11 is operated, that is, a keyless entry function.

Each of the reception circuits 12, 23, and 33 and each of the transmission circuits 13, 22, and 32 in the portable apparatus 11, the operation control device 21, and the update control device 31 may be replaced by a short distance wireless communication module such as a Bluetooth one. In this case, however, only the regular owner of the portable apparatus 11 can enter a communication-possible region between the portable apparatus 11 and the update control device 31.

In each of the embodiments of FIGS. 1 to 9, wireless communication may be established between the microcomputer 24 of the operation control device 21 and the microcomputer 34 of the update control device 31. It is to be noted that in this case, only the regular owner of the portable apparatus 11 can enter preferably this communication-possible region.

In each of the embodiments of FIGS. 1 to 9, the operation control device 21 may be intended to lock/unlock not only a door but also a variety of fittings (including a gate door) such as a window or a sliding door.

In each of the embodiments of FIGS. 1 to 9, the operation control device 21 may be arranged near the door 3. Furthermore, the update control device 31 may be arranged in any region as far as only the regular owner of the portable apparatus 11 can enter it. Preferably, however, it is arranged where the owner visits frequently.

For example, the portable apparatus 11 may be connectable to a switched line device such as a cellular phone or a personal digital assistant (PDA), while the update control device 31 may be provided with a switched line portion that can communicate with that switched line device. In such a configuration, the above-mentioned updating operation can be carried out through communication between the update control device 31 and the portable apparatus 11 using such a switched line. In such a manner, an updating procedure can be carried out even if it is impossible to perform updating by bringing the portable apparatus 11 near the update control device 31 within a validity term. Furthermore, the operability of the electronic key system 1 can be improved further.

If no updating is carried out for a long period (for example, one week), an ID code of the portable apparatus 11 registered in the operation control device 21 and the update control device 31 may be deleted automatically.

Therefore, the present examples and embodiments are to be considered as illustrative and not restrictive and the invention is not to be limited to the details given herein, but may be modified within the scope and equivalence of the appended claims.

The invention claimed is:

1. An electronic key system comprising:
   a portable apparatus that is carried by an owner, the portable apparatus selectively wirelessly transmitting a first signal and a second signal;
   an operation control device authorizing an operation of a predetermined operation object based on reception of the first signal transmitted by the portable apparatus;
   security means, wherein the security means operates based on reception of the second signal transmitted by the portable apparatus;
   an update control device located within a structure under the control of the owner, wirelessly transmitting an update signal limited to a private region inside said structure, said update signal receivable by said portable apparatus;
   wherein the portable apparatus has a counter and a portable apparatus controller, wherein the counter counts time or a value that represents the number of times that the portable apparatus is used for controlling the operation control device, wherein, when receiving the update signal, the portable apparatus controller resets the counter, wherein when the counting value of the counter is equal to or less than a predetermined limit value, the portable apparatus controller selects the first signal as a signal to be transmitted, and wherein, when the counting value of the counter is in excess of the limit value, the portable apparatus controller selects the second signal as a signal to be transmitted.

2. The electronic key system according to claim 1, wherein the security means inhibits the operation of the operation object based on reception of the second signal.

3. The electronic key system according to claim 1, wherein the security means includes an alarm emitting alarm sound based on reception of the second signal.

4. The electronic key system according to claim 1, wherein the operation object is a key or a starting device for an engine of a vehicle.

5. The electronic key system according to claim 1, wherein the update signal includes the limit value, wherein the update control device further includes setting means for variably setting the limit value, wherein the portable apparatus has a rewriteable memory, and wherein the memory records the limit value included in a received update signal.

6. The electronic key system according to claim 5, wherein, when the limit value included in the received update signal is different from the limit value that is memorized in the memory, the memory rewrites the memorized limit value to the limit value included in the received update signal.

7. The electronic key system according to claim 1, wherein the portable apparatus transmits a completion signal to the update control device when the counter is reset based on reception of the update signal, and wherein the update control device includes reporting means that operates when having received the completion signal.

8. The electronic key system according to claim 1, wherein the portable apparatus has reporting means that reports whether the count value is not more than the limit value.

9. An electronic key system comprising:
   a portable apparatus that is carried by an owner, the portable apparatus wirelessly transmitting an information signal including a portable apparatus information;
   an operation control device controlling an operation of a predetermined operation object, wherein the operation control device receives the information signal transmitted from the portable apparatus;
   security means;
   an update control device located within a structure under the control of the owner, wirelessly transmitting a request signal limited to a private region inside said structure, said request signal receivable by said portable apparatus, wherein the portable apparatus wirelessly transmits a response signal based on reception of request signal, wherein the update control device receives the response signal and the portable apparatus information that is included in the information signal from the operation control device;
   wherein the update control device has a counter counting time or a value that represents the number of times that the portable apparatus is used for controlling the operation control device, wherein, when receiving the response signal, the update control device resets the counter, wherein, when receiving the portable apparatus information, the update control device commands the operation control device to authorize the operation of the operation object if the counting value of the counter is equal to or less than a predetermined limit value, and wherein the update control device causes the security means to perform security if the counting value of the counter is in excess of the limit value.

10. The electronic key system according to claim 9, wherein the security means inhibits operation of the operating object based on a command of the update control device.

11. The electronic key system according to claim 9, wherein the security means includes an alarm for emitting alarm sound based on a command of the update control device.

12. The electronic key system according to claim 9, wherein the operation object is a key or a starting device for an engine of a vehicle.

13. The electronic key system according to claim 9, wherein the update control device includes setting means for variably setting the limit value, and wherein the portable apparatus has a rewriteable memory for recording the set limit value.

14. An electronic key system comprising:
- a portable apparatus that is carried by an owner, the portable apparatus selectively wirelessly transmitting a first signal and a second signal;
- an operation control device for authorizing an operation of a predetermined operation object based on reception of the first signal transmitted by the portable apparatus;
- security means, wherein the security means operates based on reception of the second signal transmitted by the portable apparatus;
- an update control device wirelessly transmitting an update signal in a private area for which authorized access is available only to an owner of the portable apparatus, said update signal receivable by said portable apparatus;
- wherein the portable apparatus has a counter and a portable apparatus controller, wherein the counter counts time or a value that represents the number of times that the portable apparatus is used for controlling the operation control device, wherein, when receiving the update signal, the portable apparatus controller resets the counter, wherein when the counting value of the counter is equal to or less than a predetermined limit value, the portable apparatus controller selects the first signal as a signal to be transmitted, and wherein, when the counting value of the counter is in excess of the limit value, the portable apparatus controller selects the second signal as a signal to be transmitted;
- wherein the portable apparatus transmits a completion signal to the update control device when the counter is reset based on reception of the update signal, and wherein the update control device includes reporting means that operates when having received the completion signal.

* * * * *